United States Patent
Murota et al.

(10) Patent No.: US 9,780,612 B2
(45) Date of Patent: Oct. 3, 2017

(54) ROTOR STRUCTURE FOR ELECTRIC ROTATING MACHINE

(71) Applicant: Nissan Motor Co., Ltd., Kanagawa (JP)

(72) Inventors: Kohei Murota, Kanagawa (JP); Tohru Nakada, Kanagawa (JP)

(73) Assignee: NISSAN MOTOR CO., LTD., Kanagawa (JP)

(*) Notice: Subject to any disclaimer, the term of this patent is extended or adjusted under 35 U.S.C. 154(b) by 0 days.

(21) Appl. No.: 15/126,424

(22) PCT Filed: Feb. 25, 2015

(86) PCT No.: PCT/JP2015/055378
§ 371 (c)(1),
(2) Date: Sep. 15, 2016

(87) PCT Pub. No.: WO2015/141415
PCT Pub. Date: Sep. 24, 2015

(65) Prior Publication Data
US 2017/0085142 A1    Mar. 23, 2017

(30) Foreign Application Priority Data

Mar. 18, 2014 (JP) .................. 2014-054265

(51) Int. Cl.
*H02K 1/27* (2006.01)
*H02K 21/14* (2006.01)

(52) U.S. Cl.
CPC .......... *H02K 1/276* (2013.01); *H02K 1/2766* (2013.01); *H02K 21/14* (2013.01); *H02K 2213/03* (2013.01)

(58) Field of Classification Search
CPC .. H02K 1/22; H02K 1/27; H02K 1/27; H02K 1/2706; H02K 1/276; H02K 1/2766; H02K 21/12; H02K 21/14; H02K 29/03
(Continued)

(56) References Cited

U.S. PATENT DOCUMENTS 7,362,025 B2    4/2008 Utaka
7,560,842 B2 *  7/2009 Hattori .................. H02K 1/2766
                                                310/156.53
(Continued)

FOREIGN PATENT DOCUMENTS

CN    103607061 A    2/2014
JP    H08-336250 A   12/1996
(Continued)

OTHER PUBLICATIONS

International Preliminary Report on Patentability issued in corresponding Application No. PCT/JP2015/055378, mailed on Sep. 22, 2016 (11 pages).

*Primary Examiner* — Tran Nguyen
(74) *Attorney, Agent, or Firm* — Osha Liang LLP

(57) ABSTRACT

A rotor structure for an electric rotating machine has a rotor, a plurality of strip-shaped permanent magnets which are arranged in a circumferential direction of the rotor, each of which penetrates the rotor in an axial direction of the rotor, flux barriers which are air gaps provided at positions corresponding to width-direction end portions of the permanent magnets to face the width-direction end portions of the permanent magnets, and demagnetization prevention holes, each of which is provided at a position in a vicinity of a corresponding one of the flux barriers and on an opposite side of the flux barrier from a stator and configured to reduce demagnetization at a corresponding one of the width-direction end portions of the permanent magnets.

4 Claims, 5 Drawing Sheets

(58) Field of Classification Search
USPC .................................. 310/156.53–156.57
See application file for complete search history.

(56) References Cited

U.S. PATENT DOCUMENTS

| | | | | |
|---|---|---|---|---|
| 7,612,480 | B2* | 11/2009 | Fujii | H02K 1/2766 |
| | | | | 310/156.53 |
| 2005/0269888 | A1 | 12/2005 | Utaka | |
| 2006/0028082 | A1* | 2/2006 | Asagara | H02K 1/276 |
| | | | | 310/156.53 |
| 2006/0043812 | A1 | 3/2006 | Cheong et al. | |
| 2008/0136281 | A1* | 6/2008 | Fujii | H02K 1/2766 |
| | | | | 310/156.08 |
| 2009/0140592 | A1* | 6/2009 | Rahman | H02K 1/2766 |
| | | | | 310/156.53 |
| 2009/0140593 | A1* | 6/2009 | Kaiser | H02K 1/2766 |
| | | | | 310/156.53 |
| 2013/0113327 | A1 | 5/2013 | Morishita et al. | |

FOREIGN PATENT DOCUMENTS

| | | |
|---|---|---|
| JP | 2003-143788 A | 5/2003 |
| JP | 2008-148391 A | 6/2008 |
| JP | 2008-211934 A | 9/2008 |
| JP | 2008-278591 A | 11/2008 |
| JP | 2010-4673 A | 1/2010 |
| JP | 2013-115997 A | 6/2013 |
| JP | 2013-176260 A | 9/2013 |
| WO | 2013/077109 A1 | 5/2013 |

* cited by examiner

MAGNET TEMPERATURE

DISTANCE BETWEEN EDGE PORTION OF MAGNET
AND DEMAGNETIZATION PREVENTION HOLE

POSITION OF DEMAGNETIZATION PREVENTION HOLE

ROTOR STRUCTURE FOR ELECTRIC ROTATING MACHINE

CROSS-REFERENCE TO RELATED APPLICATIONS

This application is a national stage application of PCT/JP2015/055378 filed Feb. 25, 2015, and claims foreign priority to Japanese Patent Application No. 2014-054265 filed Mar. 18, 2014, which are incorporated herein by reference in their entirety.

BACKGROUND

Technical Field

The present invention relates to a rotor structure for a permanent magnet-type electric rotating machine.

Related Art

As a rotor structure for a permanent magnet-type electric rotating machine, Patent Literature 1 discloses a structure in which flux barriers (air gaps) are provided as a countermeasure against leakage magnetic flux at width-direction end portions of strip-shaped permanent magnets arranged to penetrate a rotor in an axial direction thereof.

Specifically, the strip-shaped permanent magnets are arranged at a regular pitch in a circumferential direction, while penetrating the rotor in the axial direction in a vicinity of an outer peripheral surface of the rotor. The flux barriers are provided at positions corresponding to the width-direction end portions of the permanent magnets in the rotor and extend to positions near the outer peripheral surface of the rotor. The flux barriers are provided to face the width-direction end portions of the permanent magnets.

By providing the flux barriers at the width-direction end portions of the permanent magnets, the width between the outer peripheral surface of the rotor and each flux barrier is reduced to reduce the leakage magnetic flux (magnetic flux which is not linked to the stator and does not contribute to the torque), and the motor torque is improved by increasing the magnetic flux of the magnets usable as the motor torque.

CITATION LIST

Patent Literature

Patent Literature 1: Japanese Patent Application Publication No. 2008-211934

SUMMARY OF INVENTION

It is well known that, a permanent magnet generally starts to be irreversibly demagnetized and is permanently demagnetized below a knickpoint of a material of the permanent magnet, so that the magnetic force generated by the permanent magnet decreases.

Moreover, even with the structure in which flux barriers are provided at width-direction end portions of strip-shaped permanent magnets arranged in a rotor as in the technology of Patent Literature 1, a permanent magnet-type electric rotating machine tends to be irreversibly demagnetized at a portion on a stator side of each permanent magnet, i.e., a portion near a supply side of an external magnetic field, because the magnetic flux density in the magnet becomes small at such a position.

This is because the magnitude of the external magnetic field determines how easily the irreversible demagnetization occurs. Portions near the stator, which is a source of generation of the external magnetic field, tend to be irreversibly demagnetized easily. Especially, width-direction end portions of strip-shaped permanent magnets are susceptible to the external magnetic field.

One or more embodiments of the present invention provides a rotor structure for an electric rotating machine that may reduce the demagnetization at width-direction end portions of strip-shaped permanent magnets arranged to penetrate a rotor in the axial direction thereof.

A rotor structure for an electric rotating machine according to one or more embodiments of the present invention comprises strip-shaped permanent magnets; flux barriers provided to face width-direction end portions of the permanent magnets; and demagnetization prevention holes each being provided at a position in a vicinity of the corresponding one of the flux barriers and on an opposite side of the flux barrier from a stator and each having a shape which allows the demagnetization prevention hole to be close to a demagnetization region localized on a stator side of the corresponding one of the width-direction end portions of the permanent magnets.

DETAILED DESCRIPTION

Hereinafter, embodiments of the present invention are described in detail with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
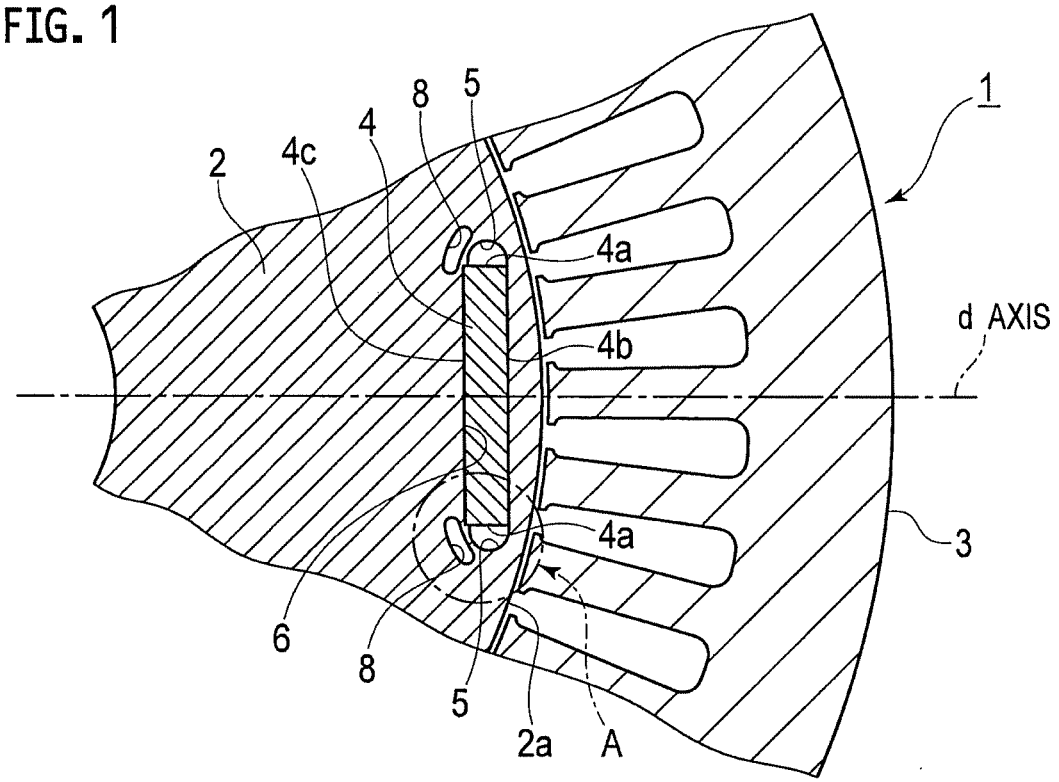
FIG. 1 is a diagram schematically showing a main portion of a rotor structure according to one or more embodiments of the present invention.

FIG. 1 schematically shows a positional relationship between a rotor 2 and a stator 3 arranged around a periphery of the rotor 2 with a necessary air gap provided therebetween in a permanent magnet-type electric rotating machine 1 according to one or more embodiments of the present invention.

The rotor 2 includes a laminate of multiple core single plates made of a magnetic metal. In a vicinity of an outer peripheral surface 2a of the rotor 2, multiple permanent magnets 4 are arranged at a regular pitch in a circumferential direction. The permanent magnets 4 are press fitted so as to penetrate the rotor in an axial direction.

Each of the permanent magnets 4 is formed like a strip, and has a rectangular shape in a cross-section perpendicular to the axial direction of the rotor 2. The permanent magnet 4 is magnetized in its thickness direction (a direction in parallel with the shorter sides of the rectangular cross-section), and has an N pole on one of the major surfaces (the surfaces forming the longer sides in the rectangular cross-section) and an S pole on the other major surface. The multiple permanent magnets 4 are arranged with the N poles and the S poles being alternately arranged in the circumferential direction in the outer peripheral surface 2a of the rotor 2.

In the permanent magnet-type electric rotating machine 1, magnetic flux, so called leakage magnetic flux, is generated near width-direction end portions 4a of the permanent magnets 4. The leakage magnetic flux is not linked to the stator 3 and does not contribute to the torque. A flux barrier 5 is provided at a position corresponding to each of the width-direction end portions 4a of the permanent magnets 4 as a countermeasure against the leakage magnetic flux. Note that the width direction of the permanent magnet 4 refers to a direction perpendicular to the thickness direction and the axial direction of the rotor 2 (a direction in parallel with the longer sides of the rectangular cross-section).

Each flux barrier 5 is formed as an air gap by extending a through-hole 6, into which the permanent magnet 4 is press fitted, in the width direction of the permanent magnet 4. The flux barrier 5 faces the width-direction end portion 4a of the permanent magnet 4. In other words, the flux barrier 5 is arranged adjacent to the width-direction end portion 4a of the permanent magnet 4. The width-direction end portion 4a of the permanent magnet 4 is exposed in the air gap of the flux barrier 5. Note that an inner peripheral surface 5a, which defines the air gap of the flux barrier 5, has a substantially arc-like shape in the cross-section perpendicular to the axial direction of the rotor 2.

Figure 2:
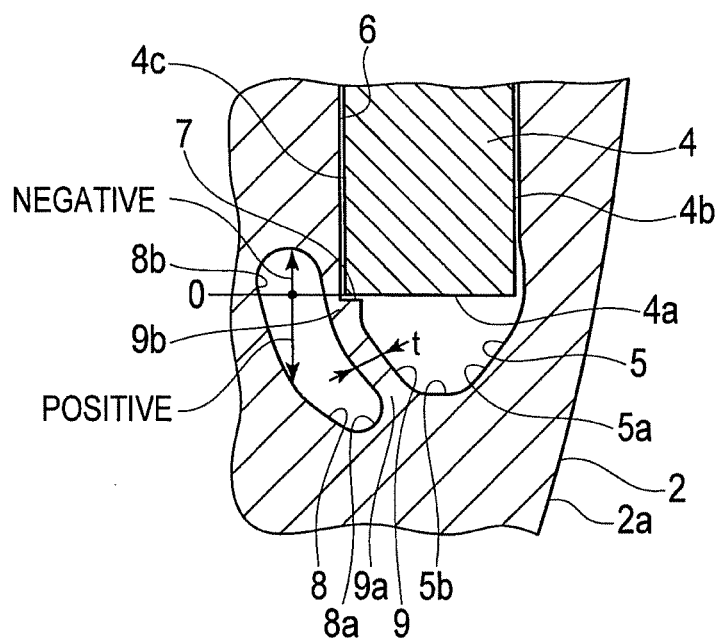
FIG. 2 is an enlarged diagram of part A of FIG. 1.

At a base portion of the flux barrier 5, a step portion 7 is provided which determines the position of the permanent magnet 4 press fitted into the through-hole 6 in the width direction as shown in FIG. 2.

In one or more embodiments of the present invention, by the provision of the flux barriers 5 at the width-direction end portions 4a of the permanent magnets 4, the magnetic path width between the outer peripheral surface 2a of the rotor 2 and each flux barrier 5 is reduced, so that the leakage magnetic flux is reduced.

In addition, the rotor 2 is provided with demagnetization prevention holes 8 for reducing the demagnetization at the width-direction end portions 4a of the permanent magnets 4. Each of the demagnetization prevention holes 8 is provided at a position which is near the corresponding one of the flux barriers 5 and on an opposite side of the flux barrier 5 from the stator 3. Here, a peripheral region of each permanent magnet 4 is divided into two pieces along a central plane of the permanent magnet 4 (along an imaginary plane passing through a center of the permanent magnet 4 in the thickness direction and being in parallel with the two major surfaces of the permanent magnet 4). In this case, a region in contact with a major surface 4b closer to the outer peripheral surface 2a of the rotor 2 is referred to as a stator 3 side region, whereas a region in contact with a major surface 4c more distant from the outer peripheral surface 2a of the rotor 2 is referred to as an opposite side region from the stator 3. The distance between the outer peripheral surface 2a of the rotor 2 and each of the major surfaces of the permanent magnet 4 can be defined as, for example, the length of a perpendicular line drawn from a point on the outer peripheral surface 2a of the rotor 2 to the major surface of the permanent magnet 4 in the cross-section perpendicular to the axial direction of the rotor 2. In one or more embodiments of the present invention, since each demagnetization prevention hole 8 is provided at the position on the opposite side of the corresponding flux barrier 5 from the stator 3, the demagnetization prevention hole 8 is overlapped with the flux barrier 5 in a view of the permanent magnet 4 in its thickness direction.

Figure 3A:
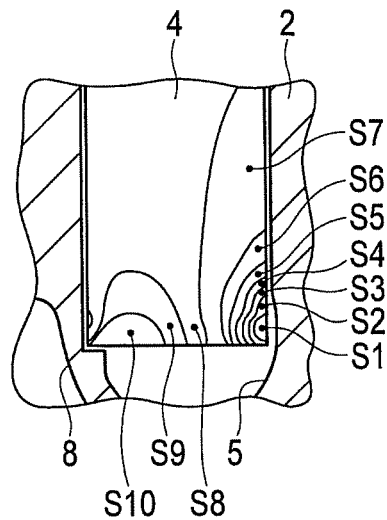
FIGS. 3A-3B are diagrams showing how the magnetic flux density is distributed at a width-direction end portion of a permanent magnet of FIG. 2 in comparison with a Comparative Example.
Figure 3B:
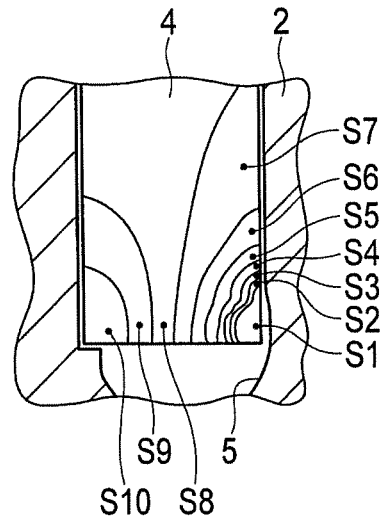

FIGS. 3A-3B show a distribution of the internal magnetic flux density of the permanent magnet 4 in the cross-section perpendicular to the axial direction of the rotor 2 in magnetic flux density ranks S1 to S10. As shown in FIGS. 3A-3B, a demagnetization region S1 is localized at an edge portion of the permanent magnet 4 on the stator 3 side, more specifically, at a region of the width-direction end portion 4a of the permanent magnet 4 on the stator 3 side (a region closer to the outer peripheral surface 2a of the rotor 2).

In this respect, the demagnetization prevention hole 8 in one or more embodiments of the present invention has a shape which allows the demagnetization prevention hole 8 itself to be as close to the demagnetization region S1 as possible.

For example, as shown in FIG. 2, the demagnetization prevention hole 8 is formed in an arc shape extending along the periphery of the flux barrier 5 in the cross-section perpendicular to the axial direction of the rotor 2. The demagnetization prevention hole 8 extends around the width-direction end portion 4a of the permanent magnet 4 in a curved manner from a center side (the opposite side from the stator 3) to an outer side (the stator 3 side) of the rotor 2. In other words, the demagnetization prevention hole 8 extends along the periphery of the flux barrier 5 from the opposite side region from the stator 3 to the stator 3 side region. In addition, a distal end portion 8a (a portion which is the most distant from a center of the permanent magnet 4 in its width direction in terms of the position in the width direction of the permanent magnet 4) of the demagnetization prevention hole 8 is positioned outside a distal end portion 5b of the flux barrier 5 in terms of the position in the width direction of the permanent magnet 4. Note that the positional relationship between the flux barrier 5 and the distal end portion 8a of the demagnetization prevention hole 8 is not limited to this one, but can be set, as appropriate, according to the specifications of the rotor.

In addition, the demagnetization prevention hole 8 is present at a position on a line segment 0 extended from the width-direction end portion 4a of the permanent magnet 4 in parallel with a d axis. In one or more embodiments of the present invention, the d axis coincides with a straight line connecting a rotation center axis of the rotor 2 and a width-direction center of the permanent magnet 4. In other words, a base end portion 8b of the demagnetization prevention hole 8 intersects with a straight line passing through the width-direction end portion 4a of the permanent magnet 4 and being in parallel with the thickness direction of the permanent magnet 4 in the cross-section perpendicular to the axial direction of the rotor 2.

In addition, a partition wall 9 extends between the flux barrier 5 and the demagnetization prevention hole 8. The partition wall 9 partitions the flux barrier 5 and the demagnetization prevention hole 8 from each other. The partition wall 9 constitutes a part of the inner peripheral surface 5a (a part on the opposite side from the stator 3) which defines the air gap of the flux barrier 5. A base end portion 9b of the partition wall 9 constitutes the above-described step portion 7. A distal end portion 9a of the partition wall 9 extends to a vicinity of the distal end portion 5b of the flux barrier 5. A width dimension t (thickness dimension) of the partition wall 9 is substantially constant from the base end portion 9b to the distal end portion 9a of the partition wall 9.

As described above, in the rotor 2 of one or more embodiments of the present invention, the demagnetization prevention holes 8, which prevent the demagnetization at the width-direction end portions 4a of the permanent magnets 4, are provided at positions which are in the vicinity of the flux barriers 5 provided at the width-direction end portions 4a of the strip-shaped permanent magnets 4 and which straddle the flux barriers 5.

Thus, not only the leakage magnetic flux can be reduced by the flux barriers 5 at the width-direction end portions 4a of the strip-shaped permanent magnets 4 in the rotor 2, but also the reverse magnetic field flowing from the stator 3 into the width-direction end portions 4a of the permanent magnets 4 can be reduced by providing the demagnetization prevention holes 8 to reduce the demagnetization. This makes it possible to further increase the magnetic flux of the magnets usable for the motor torque and improve the motor torque.

FIGS. 3A-3B shows the range of the demagnetization region S1 distributed on the stator 3 side of the width-direction end portion 4a of the permanent magnet 4. FIG. 3A shows that of one or more embodiments of the present invention, and FIG. 3B shows that of a Comparative Example in which no demagnetization prevention holes 8 are provided. In one or more embodiments of the present invention, the demagnetization prevention hole 8 is provided at a predetermined position corresponding to the width-direction end portion 4a of the permanent magnet 4. Hence, the area of the demagnetization region Si in the width-direction end portion 4a of the permanent magnet 4 is smaller in one or more embodiments of the present invention than in the Comparative Example.

Figure 5:
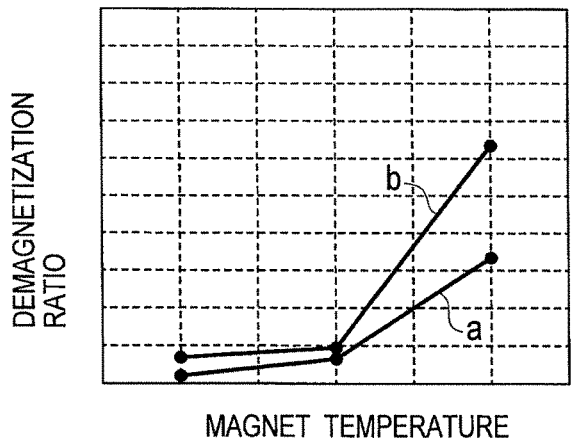
FIG. 5 is a graph showing the relationship between the demagnetization ratio and the magnet temperature at the width-direction end portion of the permanent magnet shown in FIG. 2.

FIG. 5 shows the ratio of decrease in motor-induced voltage after an application of an electric current, i.e., the demagnetization ratio, in a case where the temperature of the permanent magnets 4 of the rotor 2 of each of one or more embodiments of the present invention and a Comparative Example is changed and a reverse magnetic field is generated by applying an equal electric current to the stator 3. The line a represents the demagnetization ratio of one or more embodiments of the present invention, and the line b represents the demagnetization ratio of the Comparative Example in which no demagnetization prevention holes 8 are formed. As shown in FIG. 5, the demagnetization ratio of one or more embodiments of the present invention is low, and takes a value substantially a half of the demagnetization ratio of the Comparative Example.

Figure 4A:
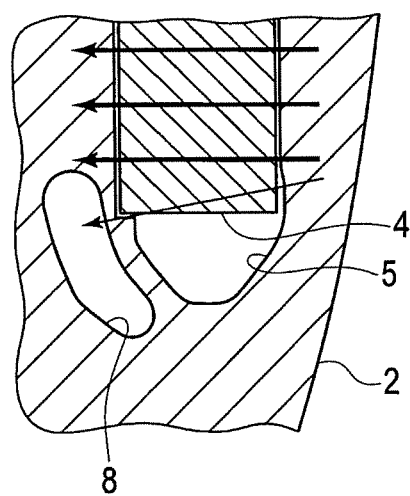
FIGS. 4A-4B are diagrams showing how the magnetic flux flows at the width-direction end portion of the permanent magnet of FIG. 2 in comparison with a Comparative Example.
Figure 4B:
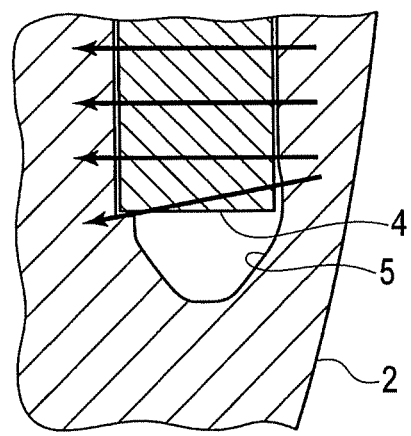

FIGS. 4A-4B show images of reverse magnetic fields in width-direction end portions 4a of permanent magnets 4. FIG. 4A shows that of one or more embodiments of the present invention, and FIG. 4B shows that of a Comparative Example in which no demagnetization prevention holes 8 are formed. The thickness of each arrow indicates the intensity of the flow of the magnetic flux from the stator 3. A thicker arrow indicates that the magnetic flux in that direction is stronger. As shown in FIGS. 4A-4B, the reverse magnetic field flowing from the stator 3 into the width-direction end portion 4a of the permanent magnet 4 can be reduced more in one or more embodiments of the present invention than in the Comparative Example. This is because the provision of the demagnetization prevention hole 8 increases the magnetoresistance of the magnetic flux flowing through the width-direction end portion 4a of the permanent magnet 4.

In one or more embodiments of the present invention, the demagnetization prevention hole 8 is formed in an arc shape substantially along the flux barrier 5 in a curved manner around the width-direction end portion 4a of the permanent magnet 4 from the center side to the stator 3 side of the rotor 2. This shape allows the demagnetization prevention hole 8 to be as close to the demagnetization region 51 as possible.

This shortens the distance between the edge portion of the permanent magnet 4 on the stator 3 side and the demagnetization prevention hole 8, so that the magnetic saturation in the above-described partition wall 9 is promoted, and the anti-demagnetization performance can be improved.

Figure 6:
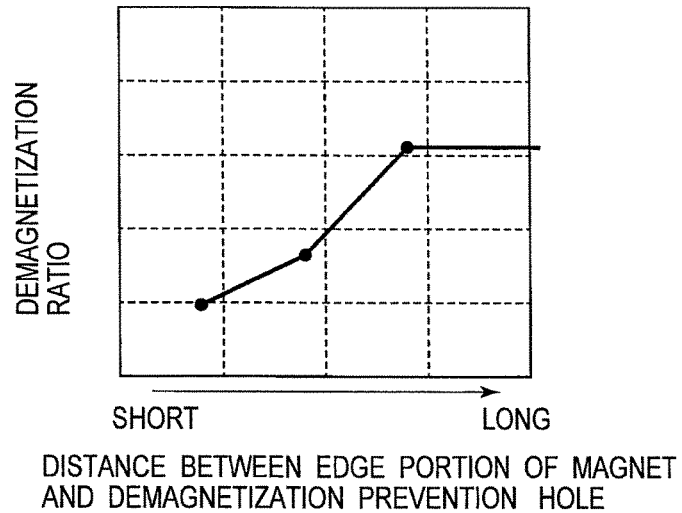
FIG. 6 is a graph showing the relationship between the demagnetization ratio and the distance between a stator-side edge portion and a demagnetization prevention hole at the width-direction end portion of the permanent magnet shown in FIG. 2.

FIG. 6 is a graph showing the relationship between the demagnetization ratio and the distance between the stator 3 side edge portion of the permanent magnet 4 and the demagnetization prevention hole 8. As described above, the magnetic saturation in the partition wall 9 reduces the reverse magnetic field flowing from the stator 3 into the width-direction end portion 4a of the permanent magnet 4. Here, the closer to the stator 3 side edge portion of the permanent magnet 4 the partition wall 9 is, the more the magnetic saturation at that portion is facilitated, and the greater the effect of reducing the demagnetization is, as shown in FIG. 6.

In addition, since the width dimension t of the partition wall 9 is substantially constant, it is possible to make the magnetic saturation substantially constant over the range of the bridge length of the partition wall 9, and to increase the effect of reducing the reverse magnetic field from the stator 3. Note that, according to one or more embodiments of the present invention, a width dimension t is smaller, because a larger effect of reducing the demagnetization can be obtained. However, an excessively small width dimension t may make it difficult to punch out pieces from a laminated steel plate. A lower limit value of the width dimension t according to one or more embodiments of the present invention is twice the thickness of a single laminated steel plate, whereas an upper limit value thereof according to one or more embodiments of the present invention is twice the thickness of the permanent magnet 4 (the dimension of the permanent magnet 4 in parallel with the d axis).

In addition, each of the demagnetization prevention holes 8 is set to be present at a position on the line segment 0 extended from the corresponding one of the width-direction end portions 4a of the permanent magnets 4 in parallel with the d axis.

Figure 7:
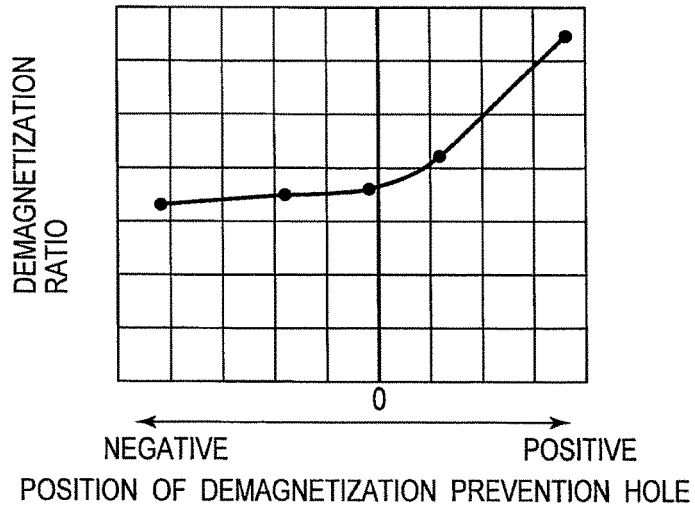
FIG. 7 is a graph showing the relationship between the demagnetization ratio and the position of the demagnetization prevention hole at the width-direction end portion of the permanent magnet shown in FIG. 2.

FIG. 7 is a graph showing the relationship between the demagnetization ratio and the position of the demagnetization prevention hole 8. As can be seen from this graph, the effect saturates, when the demagnetization prevention holes 8 are present on a negative side of the line segment 0, where the demagnetization prevention holes 8 are located behind the permanent magnets 4, i.e., when the demagnetization prevention holes 8 are present inside the width-direction end portions 4a of the permanent magnets 4 in terms of the position in the width direction of the permanent magnets 4. Accordingly, for improvement of the anti-demagnetization performance, according to one or more embodiments of the present invention, each of the demagnetization prevention holes 8 is placed at the position on the extension of the line segment 0.

Embodiments of the present invention are described above. However, the embodiments are mere examples provided to help understanding of the present invention, and the present invention is not limited to the above embodiments. The technical scope of the present invention is not limited to the specific technical matters disclosed in the embodiments above, but includes various modifications, alterations, alternative technologies, and the like which can be easily derived from the specific technical matters.

Figure 8A:
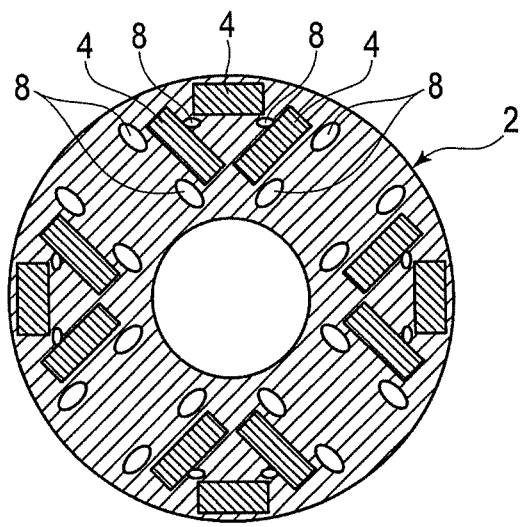
FIGS. 8A-8C are diagrams showing modifications of arrangement of permanent magnets.
Figure 8B:
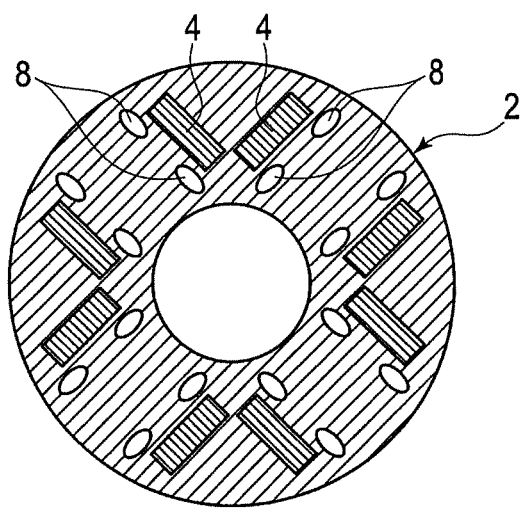
Figure 8C:
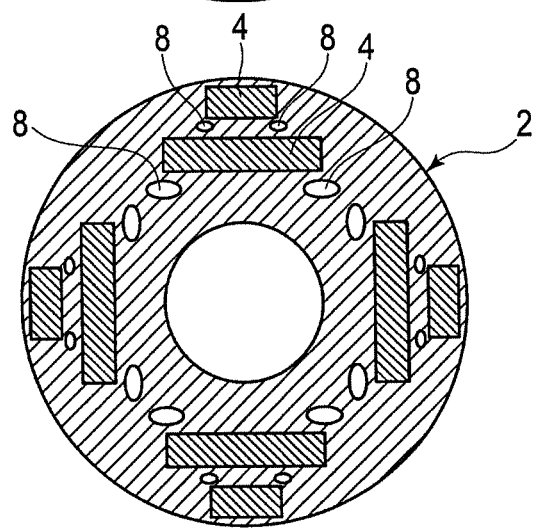

For example, in one or more of the above-described embodiments, the rotor structure using a single strip-shaped permanent magnet 4 per magnetic pole is shown as an example; however, one or more embodiments of the present invention can also be applied to rotor structures using multiple strip-shaped permanent magnets 4 per magnetic pole as in modifications shown FIGS. 8A-8C.

FIG. 8A shows an example in which each magnetic pole is constituted of three permanent magnets 4 arranged in a triangle, FIG. 8B shows an example in which each magnetic pole is constituted of two permanent magnets 4 arranged in a V shape, and FIG. 8C shows an example in which each magnetic pole is constituted of two permanent magnets 4 having different lengths in the width direction and being arranged at multiple stages in the d-axis direction. In FIGS. 8A-8C, the flux barriers 5 are not shown for convenience.

Figure 9A:
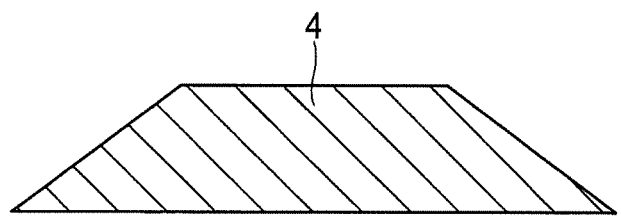
FIGS. 9A-9B are diagrams showing modifications of cross-sectional shapes of permanent magnets.
Figure 9B:
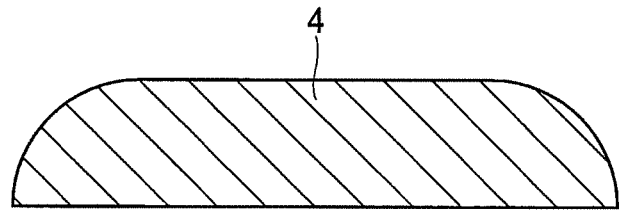

In addition, the cross-sectional shape of each of the permanent magnets 4 in the cross-section perpendicular to the axial direction of the rotor 2 is not limited to the rectangular cross-section, but any shape can be selected, such as a trapezoidal shape shown in FIG. 9A, a semi-elliptical shape shown in FIG. 9B, or an unillustrated arc-like curved shape, according to the specifications of the rotor.

One or more embodiments of the present invention may be applied to a permanent magnet-type electric rotating machine.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

REFERENCE SIGNS LIST 1 electric rotating machine
2 rotor
3 stator
4 permanent magnet
4a width-direction end portion of permanent magnet
5 flux barrier
6 through-hole
8 demagnetization prevention hole
9 partition wall
S1 demagnetization region
0 line segment in parallel with d axis
t width dimension of partition wall

The invention claimed is:

1. A rotor structure for an electric rotating machine, comprising:
   a rotor;
   a plurality of strip-shaped permanent magnets that are arranged in a circumferential direction of the rotor, wherein each of the plurality of strip-shaped permanent magnets penetrates the rotor in an axial direction of the rotor;
   flux barriers that are air gaps provided at positions corresponding to width-direction end portions of the permanent magnets, wherein the flux barriers respectively face the width-direction end portions of the permanent magnets; and
   demagnetization prevention holes, each of the demagnetization prevention holes is provided at a position in a vicinity of a corresponding one of the flux barriers and each of the demagnetization prevention holes is located on an inner side, in radial direction, of the flux barrier,
   wherein the inner side is opposite an outer side, in a radial direction, of the flux barrier,
   wherein the outer side of the flux barrier faces a stator,
   wherein each of the demagnetization prevention holes is configured to reduce demagnetization at a corresponding one of the width-direction end portions of the permanent magnets,
   wherein each of the demagnetization prevention holes has a shape that allows the demagnetization prevention hole to be in a peripheral vicinity of a demagnetization region that is localized on a radially outer region of the width-direction end portion of the permanent magnet, and
   wherein the radially outer region faces an outer peripheral surface of the rotor.

2. The rotor structure for an electric rotating machine according to claim 1,
   wherein each of the demagnetization prevention holes is formed to be present at a position on a line segment extended from the width-direction end portion of the permanent magnet in parallel with a d axis.

3. The rotor structure for an electric rotating machine according to claim 1,
   wherein a width dimension of a partition wall between each of the flux barriers and the corresponding one of the demagnetization prevention holes is set to be substantially constant.

4. The rotor structure for an electric rotating machine according to claim 2,
   wherein a width dimension of a partition wall between each of the flux barriers and the corresponding one of the demagnetization prevention holes is set to be substantially constant.

* * * * *